United States Patent [19]
Clemens

[11] 3,713,327
[45] Jan. 30, 1973

[54] SPECIFIC GRAVITY APPARATUS
[75] Inventor: Anton Hubert Clemens, Elkhart, Ind.
[73] Assignee: Miles Laboratories, Inc., Elkhart, Ind.
[22] Filed: March 11, 1971
[21] Appl. No.: 123,231

[52] U.S. Cl.....................................73/32
[51] Int. Cl.................................G01n 9/00
[58] Field of Search................73/32, 54, 59

[56] References Cited
UNITED STATES PATENTS
2,166,842   7/1939   Kagan.....................73/32 X Primary Examiner—Richard C. Queisser
Assistant Examiner—Herbert Goldstein
Attorney—Joseph C. Schwalbach, Louis E. Davidson, Harry T. Stephenson and George R. Caruso

[57] ABSTRACT

Apparatus useful in the determination of specific gravity of a test liquid by the falling-drop method is described. The apparatus provides an overflow feature wherein the test liquid which is dropped down a fluid column for specific gravity determination subsequently flows up a second column to a drain. This feature enables the initial fluid column to be conveniently repetitively used for specific gravity determinations.

2 Claims, 1 Drawing Figure

PATENTED JAN 30 1973　　　　　　　　　3,713,327
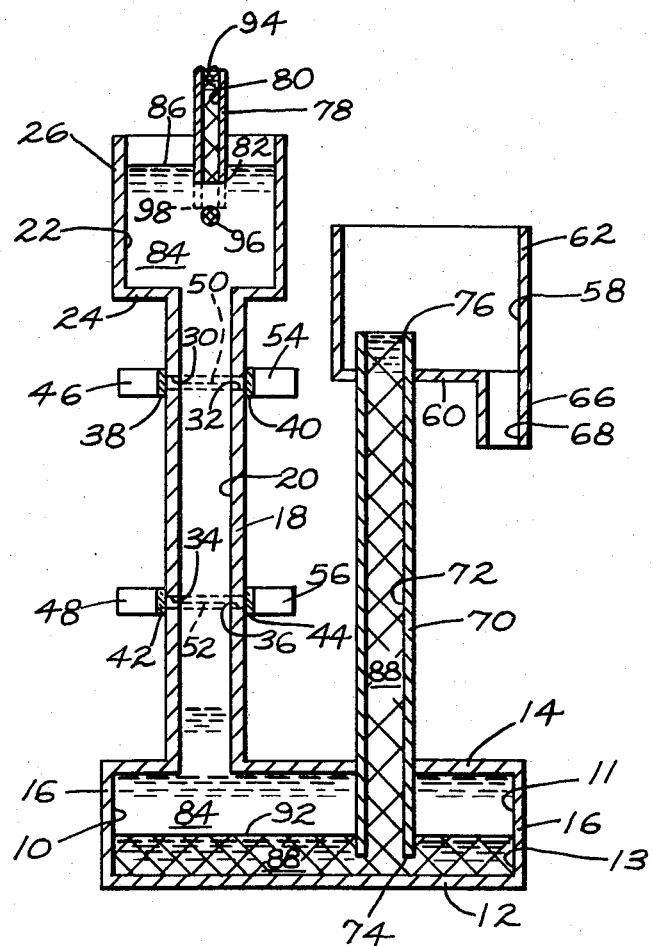
INVENTOR
ANTON HUBERT CLEMENS
BY Louis E. Davidson
ATTORNEY

SPECIFIC GRAVITY APPARATUS

BACKGROUND AND PRIOR ART

The falling-drop method is well known for determination of specific gravity. In this method a drop of the test liquid is allowed to freely fall through an immiscible fluid having a lower specific gravity. Two sensing means are located in aligned relation along the path of the falling drop. As the drop falls past each sensing means, it causes a signal to be developed by each sensing means. The time differential between the two signals is a function of the difference in specific gravities between the falling drop and the surrounding fluid. This time differential can then be used to calculate the specific gravity of the drop by well-known mathematical methods.

Most prior art apparatus used for this method employed a liquid drop falling through a gaseous medium, such as air. Such apparatus has the advantage that the falling drop can be easily discarded once it has fallen past the two sensing means. It has the disadvantage that since there is a large difference between the specific gravities of most liquids being tested and the surrounding gaseous medium, the velocity of the falling drop is relatively high. In order to prevent an inaccurate specific gravity determination based on a slight error in the time differential measurement, the two sensing means can be spaced relatively far apart so that minor errors in time differential measurement are only a small percentage of the actual overall time differential. This tends to increase the overall size of the apparatus.

In an effort to overcome this problem and permit employment of smaller apparatus, it has been suggested to employ a test liquid drop falling through another liquid, so that there is a relatively smaller difference in specific gravities between the test liquid drop and the surrounding fluid. The drop will thus fall at a relatively slower velocity. The sensing means can therefore be closer together, since any minor errors in measurement of time differential will not appreciably affect the overall accuracy of time differential measurement. Such apparatus, however, presents a problem not thus far satisfactorily solved by prior art apparatus; i.e., that of separating the dropped test liquid from the surrounding liquid for reuse of the apparatus. This is a particularly difficult problem when the apparatus is to be used for repetitive measurement of a large number of samples.

SUMMARY OF THE INVENTION

In accordance with the present invention, apparatus is provided which is useful in the determination of specific gravity of a test liquid by the falling drop method which comprises a generally U-shaped liquid receptacle providing first and second vertical columns, at least said first column containing a first liquid which is substantially immiscible with and has a specific gravity less than that of said test liquid, means for introducing successive drops of said test liquid into said first liquid in the upper portion of said first column, means for sensing the travel of a falling drop of said test liquid through said first liquid in said first column, the U-shaped configuration of said receptacle causing retention in said first column of a predetermined volume of said first liquid when successive drops of test liquid are introduced into said first liquid in said first column and permitting subsequent discharge of test liquid from the upper portion of said second column at substantially the same rate as it is added to said first column.

DESCRIPTION OF THE DRAWING

The accompanying FIGURE is a vertical cross-sectional view of apparatus embodying the present invention.

DESCRIPTION OF THE INVENTION

Referring to the accompanying FIGURE, the apparatus comprises a first liquid-tight container or chamber 10 formed by bottom wall 12, top wall 14 and sidewalls 16. The chamber 10 has an upper portion 11 and a lower portion 13. A first vertical conduit 18 having an internal passage 20 is sealingly attached at its lower end to the top wall 14 and the internal passage 20 communicates with the upper portion 11 of the chamber 10. The upper end of the conduit 18 is sealingly attached to and communicates with an open-topped reservoir 22 formed by a bottom wall 24 and sidewalls 26 as shown.

Openings 30 and 32 are located in transversely opposing relation in conduit 18. Openings 34 and 36 are located in transversely opposing relation in conduit 18 and are generally in longitudinal alignment with and below openings 30 and 32. Openings 30, 32, 34 and 36 are externally sealed by transparent members 38, 40, 42 and 44, respectively. Light sources 46 and 48 having appropriate power supplies (not shown) are mounted against transparent members 38 and 42, respectively, so that light rays 50 and 52 from such light sources can pass through openings 30 and 34 and subsequently through openings 32 and 36. Photosensitive devices 54 and 56, such as photoconductors, having appropriate power supplies (not shown) are mounted against transparent members 40 and 44, respectively, so that they can detect light passing through openings 32 and 36. The photosensitive devices and associated light rays form first and second transverse sensing means which are capable of sensing any object that interrupts or otherwise modifies the light rays, such as a falling drop. Sensors, other than photosensitive devices and associated light rays, can also be employed in apparatus of the present invention if desired.

A second open-topped chamber 58 formed by bottom wall 60 and sidewalls 62 is located above first chamber 10. a conduit 66 having an internal passage 68 is sealingly attached to the bottom wall 60 with the passage 68 communicating with the chamber 58. A second vertical conduit 70 having an internal passage 72, an inlet end 74 and an outlet end 76 is mounted in liquid-tight relation through a suitable aperture in top wall 14 of chamber 10 and in liquid-tight relation through a suitable aperture in bottom wall 60 of chamber 58. As shown, the inlet 74 communicates with the lower portion 13 of chamber 10 and the outlet 76 communicates with chamber 58 at a point generally above the level of openings 30 and 32 in conduit 18.

A conduit 78 having an internal passage 80 and an outlet end 82 is mounted for disposition of the outlet 82 thereof through the open top of and into the reservoir 22 in vertical alignment with passage 20 of conduit 18. Passage 80 contains a sample of test liquid 94 and conduit 78 is connected to suitable dispensing pump means (not shown).

As shown in the FIGURE a generally U-shaped liquid receptacle is provided by the reservoir 22, conduit 18, chamber 10 and conduit 70. The outlet end 76 of conduit 70 is located below the open top of reservoir 22. This U-shaped receptacle is initially filled with a first liquid 84, such as a silicone fluid. The amount of liquid 84 introduced into the reservoir 22 initially must be sufficient to fill the chamber 10, conduit 70 and most of conduit 18. However, any additional liquid 84 added thereafter will not result in raising the level of said liquid in the conduit 18 above the level of the outlet 76 of conduit 70 since any such excess will simply overflow from the outlet 76.

In the preferred mode of operation of the apparatus of the present invention, successive portions of a second liquid 88, such as water, which has a specific gravity higher than that of said first liquid 84 and which is immiscible with said first liquid, are introduced to reservoir 22. Such second liquid will sink to the bottom of chamber 10. As the heavier second liquid 88 sinks to the lower portion 13 of chamber 10, it displaces some of liquid 84 in chamber 10 causing a rise in the liquid levels in passages 20 and 72. When passage 72 is originally filled with liquid 84 to outlet 76, any rise in second liquid level in passage 72 will cause liquid to overflow conduit 70 and drop into chamber 58 for subsequent removal through the drain formed by passage 68. Any rise in the liquid level in passage 20 can be accommodated by reservoir 22. As portions of second liquid 88 are added to chamber 10, the upper level 92 of liquid 88 in chamber 10 will rise to a level just slightly above inlet 74 of conduit 70. Subsequent additions of portions of liquid 88 will not increase the height of level 92, but the level of liquid 88 in passage 72 will rise above level 92. Continued additions of liquid 88 to chamber 10 will cause liquid 88 to rise in passage 72 until it completely fills such passage. The first liquid in reservoir 22 will rise to form the first liquid level 86. The relationships between liquids 84 and 88 will then be as shown in the FIGURE. This apparatus configuration causes retention in the conduit 18 of a predetermined volume of first liquid.

The above described apparatus thus has a second liquid 88 contained within conduit passage 72 and the lower portion 13 of chamber 10 to form a second vertical liquid column. This second liquid is immiscible with and has a higher specific gravity than the first liquid 84 which is capable of floating on the second liquid 88 in chamber 10 and filling the upper portion 11 of chamber 10, passage 20 and reservoir 22 to form a first vertical liquid column.

In order to determine the specific gravity of a test liquid employing the apparatus of the present invention, the conduit 78 containing test liquid 94, such as urine, which has a higher specific gravity than and is substantially immiscible with first liquid 84 but which is miscible with second liquid 88, is placed in reservoir 22 in vertical alignment with passage 20. A pump (not shown) in communication with conduit 78 is activated to discharge a specified amount of test liquid in the form of drop 96 from outlet 82 of conduit 78. Drop 96 falls past light rays 50 and 52 in proximity to and activating sensing means 54 and 56 mounted in conjunction with the vertical liquid column in conduit 18 and sending signals to a computation circuit (not shown) for determination of specific gravity. Drop 96 then falls into lower portion 13 of chamber 10 which forms a collection means for such drop causing a displacement of a corresponding volume of liquid 88 out of the outlet 76 of conduit 70 and subsequently out through the drain passage 68. This can be repeated as many times as desired and the liquid levels will remain as shown in the FIGURE. If similar test liquids are repeatedly used, liquid 88 will eventually be substantially the same composition as the test liquid and the test liquid collected in chamber 10 will be subsequently conveyed out through the second vertical liquid column communicating with chamber 10 for removal from the apparatus.

In another mode of operation of the apparatus the U-shaped liquid receptacle formed by reservoir 22, conduit 18, chamber 10 and conduit 70 is filled to outlet 76 with a first liquid 84, such as a silicone fluid. Successive drops of a test fluid 94, such as urine, which has a higher specific gravity than and is substantially immiscible with said first liquid 84 through passage 20 for measurement of specific gravity will form a second liquid in the lower portion 13 of chamber 10 causing displacement of a corresponding volume of liquid 84 out of the upper end of the conduit 72. continued addition of drops of test fluid through passage 20 with eventually result in passage 72 being filled with the test fluid and the level of the first liquid 84 will rise in reservoir 22 as shown in the FIGURE. In this operational mode, the test fluid 94 acts in the same way as that described above for second liquid 88.

If a test liquid drop is allowed to fall onto liquid level 86, the resulting drop entering liquid 84 will tend to be misshapen in a non-predictable and non-reproducible fashion. This can tend to cause inaccuracies in the time differential measurement involving drop passage between light rays 50 and 52. The test liquid drop striking liquid level 86 can also cause satellite smaller drops to be broken off the main drop. These satellite drops cause noise in the sensing circuits and create inaccuracies in measurement.

With liquids 84 and 88 in equilibrium as shown in the FIGURE, the preferred technique for introducing the test liquid drop is shown in the FIGURE. This technique eliminates the above-discussed disadvantages. In this technique conduit 78 is introduced into reservoir 22 by a mounting means (not shown) so that the outlet 82 of conduit 78 is below liquid level 86 of first liquid 84 and is in position 98 shown in dashed lines. The pump (not shown) communicating with conduit 78 is then activated to discharge the desired test liquid quantity. Conduit 78 is then withdrawn to the position shown by solid lines or is withdrawn completely from reservoir 22. The inertia of the discharged test liquid portion prevents it from being withdrawn at the same rate as conduit 78 and it thus separates from conduit 78 in the form of drop 96. This movement is reproducible and conveniently produces uniform shaped and sized drops without any satellite drops.

What is claimed is:

1. Apparatus for the determination of the specific gravity of a test liquid by the falling drop method which comprises a generally U-shaped liquid receptacle providing first and second vertical columns wherein the upper outlet of the second vertical column is at a level below the upper outlet of the first vertical column, at least said first column containing a first liquid which is substantially immiscible with and has a specific gravity less than that of said test liquid, means for introducing successive drops of said test liquid into said first liquid in the upper portion of said first column, means for sensing the travel of a falling drop of said test liquid through said first liquid in said first column, the U-shaped configuration of said receptacle causing retention in said first column of a predetermined volume of said first liquid when successive drops of test liquid are introduced into said first liquid in said first column and permitting subsequent discharge of test liquid from the upper outlet of said second column at substantially the same rate as it is added to said first column.

2. Apparatus useful in the determination of specific gravity by the falling drop method which comprises a first chamber having an upper portion and a lower portion, a reservoir located above said first chamber, a first vertical conduit communicating between said reservoir and the upper portion of said first chamber, said first vertical conduit having first and second transverse sensing means in conjunction therewith located in generally longitudinal alignment along said first conduit, a second chamber having a drain communicating therewith located above said first chamber, a second vertical conduit communicating between the lower portion of said first chamber and said second chamber and having an inlet in said lower portion of said first chamber and an outlet in said second chamber, the outlet of said second vertical conduit being at a level below the reservoir for the first vertical conduit, the drain in said second chamber being located below the outlet of said second conduit, and means for introducing a liquid drop into said reservoir in vertical alignment with said first vertical conduit, said second vertical conduit and said lower portion of said first chamber being capable of containing a second liquid, said first vertical conduit, said reservoir and said upper portion of said first chamber being capable of containing a first liquid which is capable of floating on said second liquid in said first chamber, said second liquid being immiscible with and having a higher specific gravity than said first liquid, said apparatus being capable of functioning such that when a drop of test liquid having a specific gravity higher than that of said first liquid is introduced into said reservoir and is allowed to drop through the first vertical conduit in proximity to said first and second sensing means, said drop upon reaching the first chamber will displace a corresponding volume of said second liquid out of the outlet of said second vertical conduit into said second chamber, such displaced liquid then leaving said second chamber through said drain.

* * * * *